United States Patent Office 3,317,175
Patented May 2, 1967

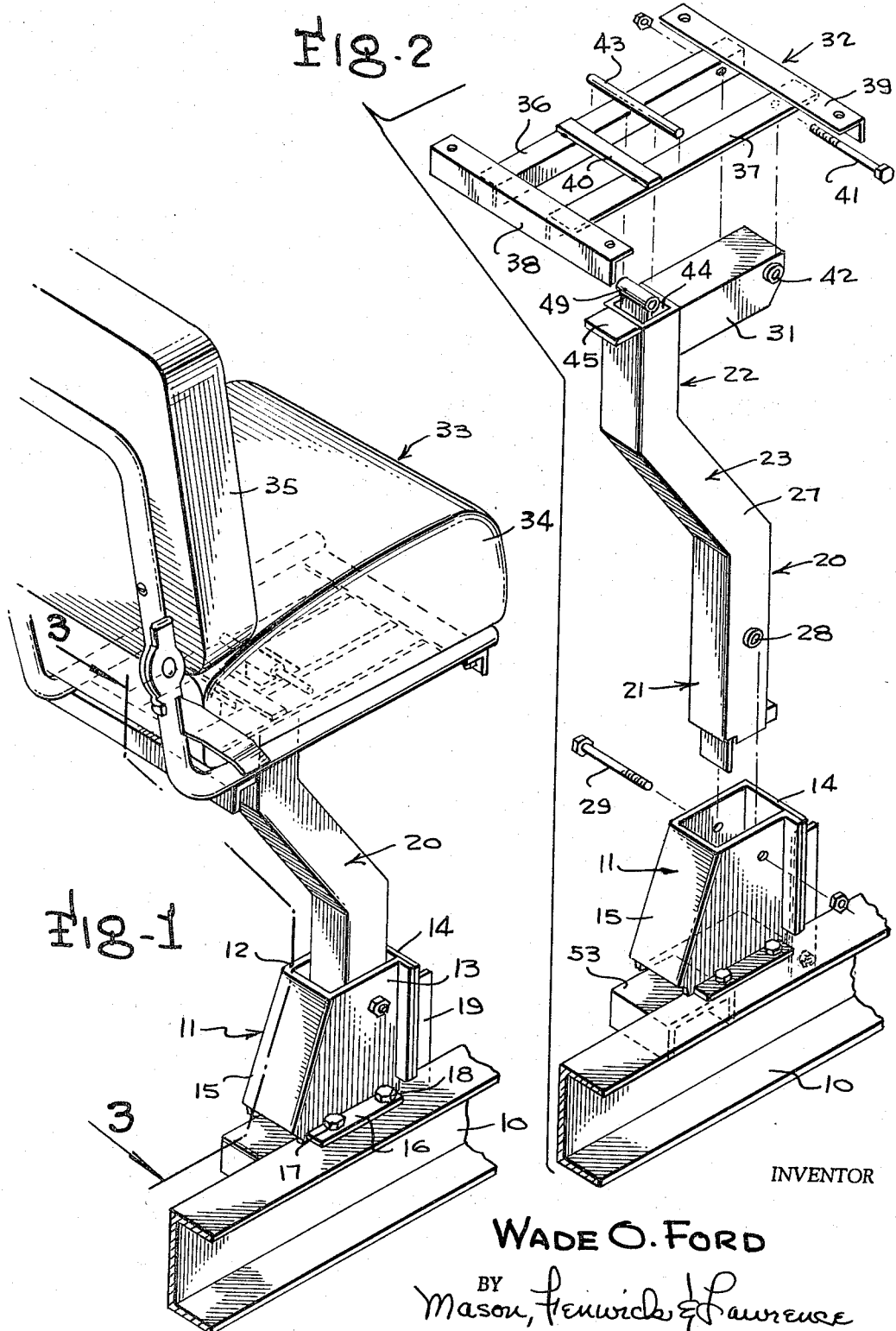

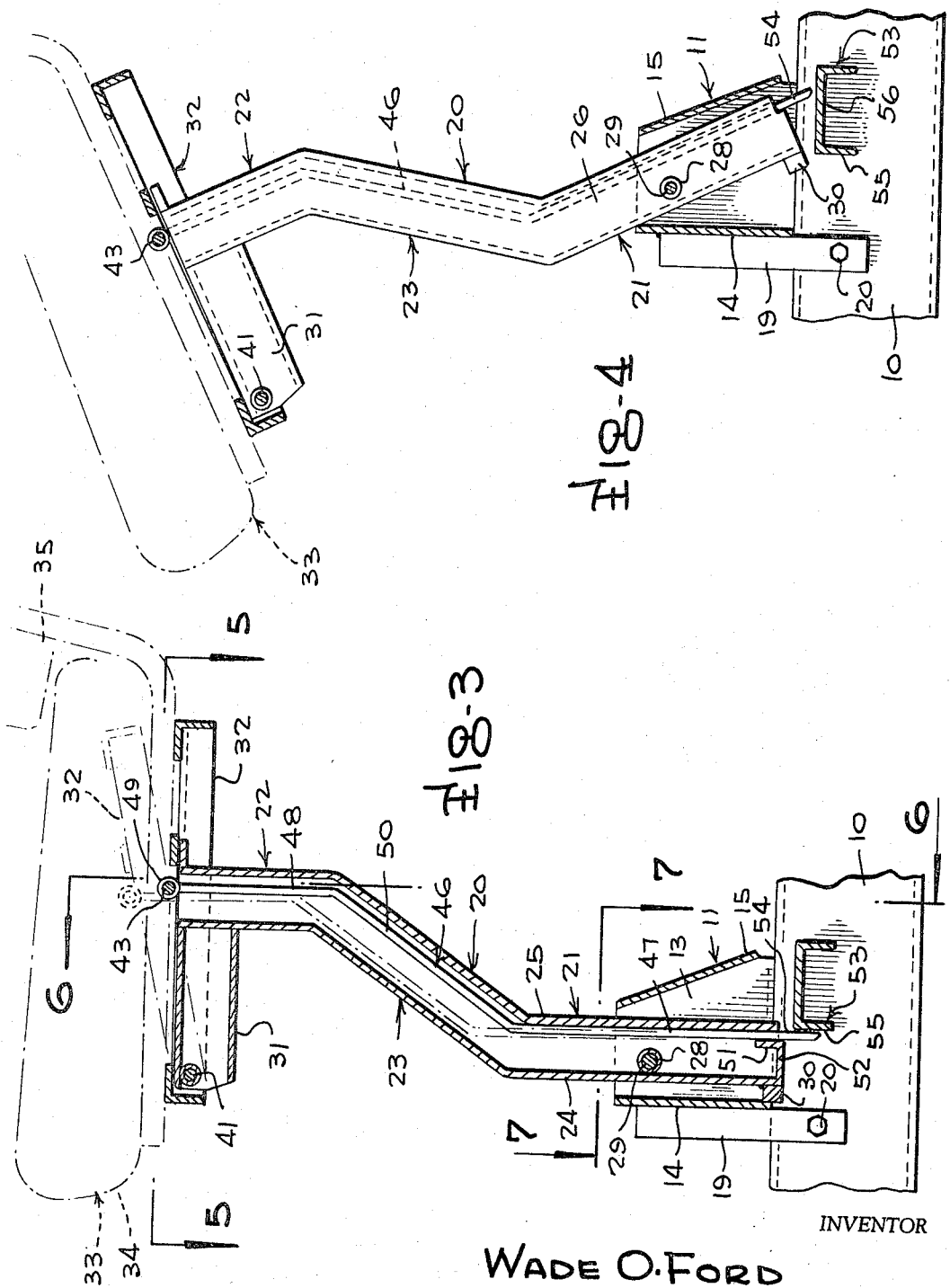

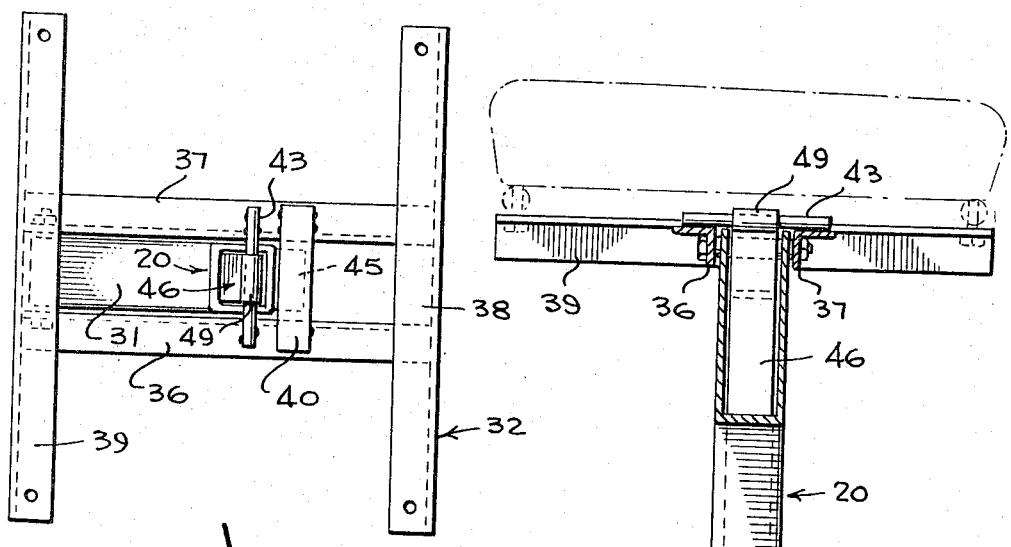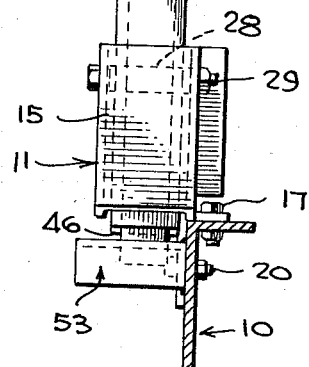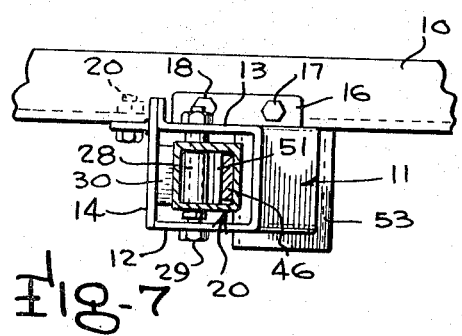

3,317,175
DISPLACEABLE SEAT PEDESTAL STRUCTURE
Wade O. Ford, 30 W. 29th St., San Angelo, Tex. 76901
Filed June 8, 1965, Ser. No. 462,172
8 Claims. (Cl. 248—398)

This invention relates to a pedestal structure and more particularly to a displaceable seat pedestal structure suitable for use in vehicles such as commercial delivery vehicles and the like.

In many commercial vehicles and particularly in the delivery type of vehicle, often it is desirable to provide a driver's seat structure which can be displaced forwardly toward the steering wheel of the vehicle or to another suitable position to permit easier access to the interior of the vehicle for various purposes. In the prior art there are various types of seat structures suitable for use in commercial vehicles which are adapted to be displaced from the normal operating position of the driver. However, such structures have been found not to be entirely satisfactory primarily because of their comparatively complicated constructions and expensive cost of manufacture.

Accordingly, it is the principal object of this invention to provide a novel pedestal structure.

Another object of this invention is to provide a novel pedestal structure suitable for use in commercial vehicles.

A further object of this invention is to provide an improved displaceable seat pedestal structure for the driver's seat in commercial vehicles.

A still further object of this invention is to provide an improved displaceable seat pedestal structure which can be displaced and locked in selected positions.

Another object of this invention is to provide a displaceable driver's seat pedestal structure for a vehicle, which can be positively locked in the normal operating position to prevent any displacement of the structure during the normal driving operation.

A further object of this invention is to provide an improved displaceable seat pedestal structure which requires a simple operation to displace the structure and lock it in selected operating and nonoperating positions.

A still further object of this invention is to provide an improved displaceable seat pedestal structure suitable for use in commercial vehicles, having relatively few components and which is simple in construction.

Another object of this invention is to provide an improved displaceable seat pedestal structure for commercial vehicles, which is easy to assemble and inexpensive to manufacture.

Other objects and advantages of the present invention will become more apparent to those persons skilled in the art, from the following description when taken in conjunction with the accompanying drawings, wherein:

FIGURE 1 is a perspective view of an embodiment of the invention, having portions thereof broken away;

FIGURE 2 is a perspective view of the embodiment of the invention shown in FIGURE 1, illustrating the components in exploded relation;

FIGURE 3 is a cross-sectional view taken along line 3—3 in FIGURE 1, also illustrating the positions of several components in the unlocked condition;

FIGURE 4 is a side elevational view of the embodiment of the invention shown in FIGURE 1, illustrating the invention in the nonoperating position;

FIGURE 5 is a cross-sectional view taken along line 5—5 in FIGURE 3;

FIGURE 6 is a cross-sectional view taken along line 6—6 in FIGURE 3; and

FIGURE 7 is a cross-sectional view taken along line 7—7 in FIGURE 3.

Briefly described, the present invention provides a displaceable seat pedestal generally comprising a support means, an upright means pivotally connected to the support means for movement in a vertical plane, movable locking means mounted for movement with the upright means, and means for moving the locking means selectively into and out of locking positions when the upright means is disposed at a predetermined angle relative to the support means.

In a specific embodiment of the invention, there is provided a displaceable seat pedestal structure comprising a mounting bracket having a wall member, stop means spaced from the wall member, upright means pivotally connected to the mounting bracket for movement in a vertical plane intersecting the wall member and the stop means, locking means carried by the upright means which are movable substantially along the length thereof, and means carried by the upright means for selectively moving the locking means into and out of locking engagement with the stop means when the upright means is positioned to engage the wall member.

Referring to the drawings, there is illustrated the preferred embodiment of the invention. Numeral 10 designates a member of the vehicle frame. Mounted on the frame member 10 is a mounting bracket 11 having spaced side walls 12 and 13, a vertical front wall 14 and a rearwardly and downwardly inclined rear wall 15. The side wall 13 is provided with a laterally projecting flange 16 which is secured to the frame member 10 by means of suitable bolts 17 and 18. The mounting bracket 11 further rigidly is secured to the frame member 10 by means of a brace member 19, preferably welded to the front wall 14 and secured to the frame member by means of a suitable bolt 20. Received within the bracket member 11 through the upper opening thereof is a hollow or tubular post member 20. The post member includes a lower section 21 extending into the mounting bracket 11, an upper section 22 disposed parallel to the lower section 21 and a connecting rearwardly and upwardly inclined portion 23. The post member 20 has substantially a rectangular cross-sectional configuration, including a front wall 24, a rear wall 25 and side walls 26 and 27. The lower section 21 of the post member is provided with a sleeve member 28 which receives a pivot pin 29 mounted in the mounting bracket 11, to permit pivotal movement of the post member in a substantially vertical plane.

Referring to FIGURES 3 and 4 the clockwise pivotal movement of the post member is limited by a stop element 30 mounted on the lower front end of the lower post section 21, which engages the front wall 14 of the bracket member. Similarly, the counterclockwise movement of the post member is limited by the engagement of the front wall 24 of the post member with the front wall 14 of the mounting bracket.

The upper end of post section 24 is provided with a forwardly extending arm member 31. Pivotally mounted on the forward end of the arm member 31 is a seat frame 32, which supports the seat structure 33 including a seat portion 34 and a back rest portion 35. The seat frame structure 32 includes a pair of longitudinally extending members 36 and 37 and a pair of transversely extending members 38 and 39 mounted on the forward and rearward ends of the members 36 and 37. The members 36 and 37 further are reinforced by means of a brace member 40. The frame member 32 is adapted for independent pivotal movement relative to the post member 20, in a substantially vertical plane, by means of a pivot pin 41 which extends through suitable openings in the forward ends of frame members 36 and 37 and a sleeve 42 disposed in the forward end of the arm member 31.

Rigidly mounted on the frame members 36 and 37 between the seat frame members 38 and 39 is a transversely extending pivot pin 43. The pin member 43 overlies the open upper end 44 of the upper post section 22 when the seat frame members 36 and 37 are disposed parallel to the top surface of the arm member 31 and the brace member 40 is seated on a rearwardly extending flange member 45 mounted on the upper post section 22. Pivotally mounted on the pin member 43 is a lock member 36 which extends downwardly through the interior of the entire post member and projects below the lower post section 21 when the brace member 40 of the seat frame is seated on the flange 45. The lock member 46 is comprised of a lower section 47, a parallel upper section 48 having a sleeve portion 49 disposed on the upper end thereof for receiving the pivot pin 43 therethrough, and an inclined interconnecting section 50. The lower lock member section 47 is maintained substantially adjacent the rear wall member of the lower post section 21 by means of an upwardly extending flange portion 51 mounted on a bottom wall member 52 which is carried by the front wall 24 of the lower post section 21.

Mounted on the frame member 10 below the bracket member 11 is a stop member 53. The stop member is disposed without and adjacent to the radial arc defined by the movement of the lower end of the lower post section 21 when the post member is pivoted about the pivot pin 29. When the post member is in the upright position as illustrated in FIGURE 3, with the stop member 30 engaging the front wall member 14 of the mounting bracket, and the seat structure 32 being seated in its lowermost position relative to the upper end of the post member, the lower end 54 of the locking member is adapted to engage the front wall 55 of the stop member 53 to prevent the upper end of the pedestal from being tilted forwardly. In the same position the engagement of the stop member 30 with the front wall 14 of the mounting bracket prevents the upper end of the post member from being tilted backwards. In addition, when the post member 20 is in the inoperative position with the seat structure 32 in the lowermost position relative to the post member, as illustrated in FIGURE 4, the further forward tilting of the upper end of the post member is prevented by the engagement of the front wall of the post member with the front wall 14 of the mounting bracket, and the rearward tilting of the post member is prevented by the engagement of the lower end 54 of the lock member with the upper wall 56 of the stop member 53.

FIGURE 3 illustrates the pedestal structure in the operative position in which the seat member is prevented from tilting forwardly by the engagement of the lower end 54 of the lock member with the front wall 55 of the stop member 53, and is prevented from tilting rearwardly by the engagement of the stop member 30 with the front wall 14 of the mounting bracket. When it is desired to move the seat forwardly in the position as illustrated in FIGURE 4, the seat is moved forwardly so that the seat frame structure 32 first is caused to pivot about pivot pin 41, lifting the lock member 46 clear of the stop member 53. As the seat is moved forwardly, tilting the post member, the lower end of the post member is permitted to bypass the stop member 53 until the front wall of the lower post section 21 engages the front wall 14 of the mounting bracket. When the tilting force on the seat structure is removed, the seat frame structure 32 is permitted to pivot back to its original position, causing the lower member 46 to move downwardly and the lower end 54 to protrude below the lower end of the post member in the position as illustrated in FIGURE 4. Further forward movement of the post member 20 is prevented by the engagement of the front wall of the lower post section 21 with the mounting bracket. Also, the rearward movement of the upper end of the post member is prevented by the engagement of the lower end portion 54 of the post member with the top wall 56 of stop member 53.

When it is desired to move the seat structure back to the normal operating position, the seat structure first is moved forwardly to cause the seat frame structure 32 to pivot about the pivot pin 41. This causes the lock member 46 to move upwardly so that the lower end 54 of the lock member is in a position to clear the stop member 53 when the post member is tilted backwardly into the position as illustrated in FIGURE 1. After the post member is tilted rearwardly and the stop member 30 engages the front wall 19 of the mounting bracket, the seat structure is permitted to be lowered, causing the seat structure 32 to pivot about its pivot pin 41 and the lock member to move downwardly into the locking position as shown in FIGURE 3.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:
1. A displaceable seat pedestal comprising a support means, upright means pivotally connected to said support means for movement in a vertical plane, a seat frame pivotally connected on the upper end of said upright member for movement substantially in a vertical plane, locking means carried by said seat frame and being movable substantially along the length of said upright means when said seat frame is pivoted and means mounted on said support means engageable by said locking means when said upright means is disposed at a predetermined angle relative to said support means, and said locking means is displaced along the length of said upright means toward said engageable means.

2. A displaceable seat pedestal comprising a support means, hollow upright means pivotally connected to said support means for movement in a vertical plane, a seat frame pivotally connected on the upper end of said upright member for independent movement relative to said upright means substantially in a vertical plane, locking means carried by said seat frame and extending through said hollow means, said locking means being displaceable relative to and substantially along the length of said upright means when said seat frame is pivoted and means mounted on said support means engageable by said locking means when said upright means is disposed at a predetermined angle relative to said support means, and said locking means is displaced along the length of said upright means toward said engageable means.

3. A displaceable seat pedestal comprising a mounting bracket having a wall member, stop means spaced from said wall member, upright means pivotally connected to said mounting bracket for movement in a vertical plane intersecting said wall member and said stop means, a seat frame pivotally connected on the upper end of said upright member for movement substantially in a vertical plane and locking means carried by said seat frame and being movable substantially along the length of said upright means into and out of locking engagement with said stop means when said upright means is positioned to engage said wall member and said frame is pivoted.

4. A displaceable seat pedestal comprising a mounting bracket having a wall member, stop means spaced from said wall member, hollow upright means pivotally connected to said mounting bracket for movement in a vertical plane intersecting said wall member and said stop means, a seat frame pivotally connected on the upper end of said upright member for movement substantially in a vertical plane and locking means carried by said seat frame and extending through said hollow upright means, said locking means being movable relative to and substantially along the length of said upright means into and out of locking engagement with said stop means when said upright means is positioned to engage said wall member and said frame is pivoted.

5. A displaceable seat pedestal comprising a mounting bracket having spaced side wall members, a front wall member and a rear wall member, stop means spaced from said front wall member, hollow upright means received within said bracket member and pivotally connected to said side wall members for movement in a vertical plane intersecting said front wall member and said stop means, the upper end of said upright member having a forwardly projecting arm member, a seat frame pivotally connected to the forward end of said arm member for independent movement relative to said hollow upright member and substantially in a vertical plane and locking means pivotally connected to said seat frame and extending through said hollow upright means, said locking means being movable relative to and substantially along the length of said upright means into and out of locking engagement with said stop means when said upright means is positioned to engage said front wall member and said frame is pivoted.

6. A displaceable seat pedestal comprising a mounting bracket having a wall member, stop means spaced from said wall member, a post member pivotally connected to said mounting bracket for movement in a vertical plane intersecting said wall member and said stop means, said stop means being disposed without the radial arc defined by the movement of the lower end of said post member when the post member is pivoted, a seat frame pivotally connected on the upper end of said post member for independent movement relative to said post member, substantially in a vertical plane and locking means carried by said seat frame being movable substantially along the length of said post member and being extendible beyond the lower end of said post member into and out of locking position with said stop means when said post member is positioned to engage said wall member and also when the lower end of said post member is pivoted away from said wall member past said stop means.

7. A displaceable seat pedestal comprising a mounting bracket having a wall member, stop means spaced from said wall member, a hollow post member pivotally connected to said mounting bracket for movement in a vertical plane intersecting said wall member and said stop means, said stop means being disposed without the radial arc defined by the movement of the lower end of said post member when the post member is pivoted, a seat frame pivotally connected on the upper end of said post member for independent movement relative to said post member, substantially in a vertical plane and locking means carried by said seat frame and extending through said hollow post member, having the lower end thereof extendible beyond the lower end of said post member into and out of locking position with said stop means when said post member is positioned to engage said wall member and also when the lower end of said post member is pivoted away from said wall member past said stop means.

8. A displaceable seat pedestal comprising a mounting bracket having spaced side wall members, a front wall member and a rear wall member, stop means spaced from said front and rear wall members, a hollow post member received within said bracket member and pivotally connected to said side wall members for movement in a vertical plane intersecting said front and rear wall members and said stop means, said stop means being disposed without the radial arc defined by the movement of the lower end of said post member when the post member is pivoted, the upper end of said post member having a forwardly projecting arm member, a seat frame pivotally connected to the forward end of said arm member for independent movement relative to said hollow post member and substantially in a vertical plane and locking means pivotally connected to said seat frame and extending through said hollow post member, said locking means being movable substantially along the length of said post member and being extendible beyond the lower end of said post member into and out of locking position with said stop means when the lower end of said post member is positioned to engage said front wall member and also when the lower end of said post member is pivoted toward the rear wall member past said stop means.

References Cited by the Examiner

UNITED STATES PATENTS

| 196,381 | 10/1877 | Pfluegner | 248—397 |
| 874,435 | 12/1907 | Prescott | 248—397 |
| 2,318,751 | 5/1943 | Carlson | 296—65 |
| 2,583,414 | 1/1952 | Chain | 248—188.1 |
| 3,088,704 | 5/1963 | Grady | 248—371 |
| 3,184,195 | 5/1965 | Wahl et al. | 248—158 |

JOHN PETO, *Primary Examiner.*

CLAUDE A. LE ROY, *Examiner.*

R. P. SEITTER, *Assistant Examiner.*